United States Patent
El-Keyi et al.

(10) Patent No.: US 12,376,041 B2
(45) Date of Patent: Jul. 29, 2025

(54) PREDICTIVE SECTORIZED AVERAGE POWER CONTROL

(71) Applicant: Telefonaktiebolaget LM Ericsson (publ), Stockholm (SE)

(72) Inventors: Amr El-Keyi, Kanata (CA); Torbjörn Wigren, Uppsala (SE); Shiguang Guo, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 430 days.

(21) Appl. No.: 17/918,187

(22) PCT Filed: Apr. 29, 2020

(86) PCT No.: PCT/IB2020/054047
§ 371 (c)(1),
(2) Date: Oct. 11, 2022

(87) PCT Pub. No.: WO2021/220036
PCT Pub. Date: Nov. 4, 2021

(65) Prior Publication Data
US 2023/0128635 A1   Apr. 27, 2023

(51) Int. Cl.
*H04W 52/00* (2009.01)
*H04B 7/0426* (2017.01)
(Continued)

(52) U.S. Cl.
CPC ........ *H04W 52/225* (2013.01); *H04B 7/0426* (2013.01); *H04W 52/367* (2013.01); *H04W 52/42* (2013.01)

(58) Field of Classification Search
CPC . H04W 52/225; H04W 52/367; H04W 52/42; H04B 7/0426
See application file for complete search history.

(56) References Cited

U.S. PATENT DOCUMENTS

| | | | |
|---|---|---|---|
| 11,503,548 B2 * | 11/2022 | Pei | H04W 52/223 |
| 2021/0076338 A1 * | 3/2021 | Chakraborty | H04W 52/0283 |

FOREIGN PATENT DOCUMENTS

| | | |
|---|---|---|
| WO | 2019/194721 A1 | 10/2019 |
| WO | 2020/073148 A1 | 4/2020 |
| WO | 2020/073191 A1 | 4/2020 |

OTHER PUBLICATIONS

International Search Report and Written Opinion dated Jan. 25, 2021 issued in PCT Application No. PCT/IB2020/054047, consisting of 14 pages.

* cited by examiner

*Primary Examiner* — Erika A Washington
(74) *Attorney, Agent, or Firm* — Weisberg I.P. Law, P.A.

(57) ABSTRACT

A method and network node for predictive sectorized average power control. A method includes determining a beamforming gain for each of a plurality of directions. The method also includes determining a total power at each of a plurality of times within a window for each of the plurality of spatial directions, the total power being based at least in part on a weighted sum of products of a beamforming gain and a downlink power allocated to a wireless device in each of the plurality of spatial directions. The method further includes determining an average of the total power within the window to produce an average power; computing a control signal based on the average power and a threshold; and controlling the transmitted total power according to the control signal by limiting a fraction of scheduled physical resource blocks to an upper limit.

22 Claims, 10 Drawing Sheets

(51) Int. Cl.
*H04W 52/22* (2009.01)
*H04W 52/36* (2009.01)
*H04W 52/42* (2009.01)

PREDICTIVE SECTORIZED AVERAGE POWER CONTROL

CROSS-REFERENCE TO RELATED APPLICATION

This application is a Submission Under 35 U.S.C. § 371 for U.S. National Stage Patent Application of International Application Number: PCT/IB2020/054047, filed Apr. 29, 2020 entitled "PREDICTIVE SECTORIZED AVERAGE POWER CONTROL," the entirety of which is incorporated herein by reference.

TECHNICAL FIELD

Wireless communication and in particular, to predictive sectorized average power control.

BACKGROUND

When radio equipment is to be deployed, regulatory radio frequency (RF) exposure regulations need to be taken into account at or before a time of deployment. These exposure limitations are typically based on the guidelines from the International Commission on Non-Ionizing Radiation Protection (ICNIRP), but may take different forms in some countries and regions. The aim of the RF exposure regulations is to reduce human exposure to RF electromagnetic fields (EMF).

The RF EMF exposure limitations become more important when new Forth Generation (4G)/Fifth Generation (5G) network nodes and radios are equipped with advanced antenna systems (AAS). The wireless standard for 4G (also referred to as Long Term Evolution (LTE)) and the wireless standard for 5G (also referred to as New Radio (NR)) are developed by the Third Generation Partnership Project (3GPP).

These AASs increase the capacity and/or coverage of a radio by addition of an antenna array that increases the beamforming gain significantly. The consequence is a concentration of the electro magnetic field into beams. As a further consequence, the traditionally used methods for calculation of exclusion zones based on the maximum Equivalent Isotropically Radiated Power (EIRP) of the node, tend to generate significantly increased exclusion zones. This increases the deployment challenges, which is why network operators are requesting functionality for reduction of exclusion zones, while strictly maintaining compliance with RF EMF exposure regulations.

More specifically, the ICNIRP and other RF EMF exposure limitations are expressed as the average power density over a specified time interval T. This power averaging opens a possibility for the requested reductions. Given a distance, the power density limit can be transformed to a corresponding power limit, for the average total transmitted power. Thus, the momentary power can be significantly higher than the regulatory limit during shorter times than T, however the transmitted average power must then be guaranteed to be below the regulatory limit, typically lower than a threshold obtained from the calculation of a reduced exclusion zone.

Average Power Control to Meet RF Exposure Regulations

A dynamic actuator and proportional-derivative (PD) controller represent one embodiment of an average power controller, to meet RF EMF exposure regulations. This controller does not perform per directional average power control.

Scheduler Actuator

Controller Structure

The average power controller described here uses the lower realization of proportional integral (PI) control in FIG. 1. That realization factors out an integrator. That integrator is placed in or close to the scheduler, to produce the dynamics of the resource limiting threshold.

As can be seen in FIG. 1, the remaining dynamics of the PI controller resemble a proportional term and a differentiating term. For this reason, average power control is applied by the PD controller together with an integrating resource limiting threshold. The relation between the parameter of the top and bottom realizations are easily obtained by equating the coefficients for equal degrees of s in:

$$C_1 + \frac{1}{T_I}\frac{1}{s} \equiv (C_2 + T_D s)\frac{1}{s} = T_D + C_2 \frac{1}{s}.$$

Integrating Fractional Scheduler Threshold

Rate control is needed in order to obtain a smooth behavior of the dynamic resource threshold applied in the scheduler to limit the momentary output power. This means that the control signal commands adjustments to the limiter, making it increase or decrease. The dynamics of the actuator mechanism (dynamic resource threshold) are therefore determined to be:

$$\dot{\gamma}(t) = u(t),$$

where $\gamma(t)$ is the dynamic resource threshold and where $u(t)$ is the control signal further discussed below. The variable t denotes continuous time. This is in line with the factored PI control structure of FIG. 1. The dynamic resource threshold is decoupled from the scheduler algorithms and expresses a fractional limitation of the scheduler not to use more than a fraction $\gamma(t)$ of its total resources. The scheduler may then limit the number of frequency resources (physical resource blocks, (PRBs)) used by the scheduler, or limit any other quantity that correlates well with the momentary output power.

Integrating Fractional Scheduler Threshold Limitation

The maximum value of $\gamma(t)$ is obviously 1.0 since it is to express a fraction of the maximum amount of scheduler resources. There is also a need to limit a lower value of $\gamma(t)$ to avoid the dynamic feedback control mechanism reducing to an unphysical value below 0.0. The following scheduler threshold limitation is therefore applied at each time:

$$\gamma_{low} \leq \gamma(t) \leq 1.0$$

Power Feedback Signal

Radio Measurement

The total momentary output power applied to an antenna array can be measured in the radio, just before the antennas. This can be done by couplers that measure the radio signal amplitude at each signal path to an antenna element. These amplitudes can then be combined into a total output power of the radio, with the antenna gain removed.

Scheduler Prediction

A simpler, but less accurate alternative is to replace the measured power by a predicted output power using information available in the scheduler or elsewhere in base band. Such a quantity could be easily obtained, e.g., by summing up the momentary scheduled power as estimated by the fraction of PRBs used at each time instant, over the time T. This approach is subject to a number of errors. These include, e.g., the actual power errors caused by re-transmissions, power boosting and power sharing between transmission layers errors, and errors caused by radio signal processing close to the antenna, including e.g., clipping to achieve peak to average power reductions, and antenna alignment errors.

Feedback Control Algorithm

FIG. 2 illustrates a case where feedback control has been enabled by the supervision mechanism described below. In FIG. 2, $\langle P_{tot} \rangle^{ref}$ denotes the setpoint for the averaged power (typically slightly less than the threshold value that has been obtained from the regulatory power density and the desired maximum radial distance of the exclusion zone), 1/s denotes the actuator dynamics with inactive lower and upper limits, $\bar{\gamma}(t)$ denotes the scheduler limitation after lower and upper limitation (inactive in FIG. 2), $P_{max,site}$ denotes the maximal total power of the site (which may include a cell, sector or carrier), w(t) denotes a disturbance representing predicted power errors, 1/(sT+1) represents a simplified autoregressive model of the averaging, $\langle P_{tot} \rangle$(s) denotes the averaged total power, e(s) denotes a measurement error, G denotes the antenna gain and EIRP(s) denotes the EIRP. Note that all quantities are here expressed in the Laplace transform domain, which is allowed since the feedback control mechanism design is performed with inactive constraints. The momentary power described above is denoted $P_{tot}(s)$.

Note that w(s) and e(s) are mathematical approximations of errors in the control loop, useful to assess performance. It is then assumed that the controller block is given by:

$$u(s) = CT(1+T_D s)(\langle P_{tot}\rangle^{ref} - \langle P_{tot}\rangle(s)).$$

This controller is of PD type. C denotes the proportional gain, and $T_D$ is the differentiation time.

Beamforming

Beamforming is a technique by which an array of transmit antennas can be utilized to focus the radiated energy in a specific target direction and/or reduce the radiated energy in other directions. Instead of simply broadcasting the transmitted signals in all directions, the antenna arrays that use beamforming determine a direction of interest and form a stronger beam in this direction. This is achieved by feeding the signal to be transmitted to each antenna element and controlling the phase and amplitude of each element separately such that the signals from different elements are added constructively at the direction of interest and destructively at the nulling directions.

A two-dimensional polarized array is considered, where $M_V$ and $M_H$ denote the number of rows and columns of the 2-dimensional antenna array, respectively, i.e., the total number of antenna elements is given by $2M_V M_H$. Let $s_{i,k}(t)$ denote the information signal that should be transmitted by the antenna array in the k-th layer of the i-th wireless device (WD). Transmit beamforming is applied by using the $2M_V M_H \times 1$ beamforming vector $w_{i,k}(t)$ where the transmitted signal vector $x_i(t)$ from the antenna array elements intended for the i-th WD at time t is represented as:

$$x_i(t) = \sum_{k=1}^{N_L} w_{i,k}(t) s_{i,k}(t)$$

where $N_L$ is the number of transmission layers. Let $M_R$ denote the number of receive antennas at the WD and let $H_i(t)$ denote the $M_R \times 2M_V M_H$ channel matrix from the network node to the i-th WD where $M_R$ is the number of antenna elements at the WD. The $M_R \times 1$ received signal vector at the WD is given by:

$$y_i(t) = H_i(t) \sum_{k=1}^{N_L} w_{i,k}(t) s_{i,k}(t) + n_i(t)$$

where $n_i(t)$ is the interference-plus noise vector received at the WD.

Codebook-Based Beamforming

In 4G and 5G communication systems, the WD can be configured to perform measurements on the downlink received signal quality and submit these measurement reports to the network node. With multi-antenna transmission capability at the network node, the measurement report includes a precoder matrix indicator (PMI) indicating what the device believes is a suitable precoder (beamforming) matrix. The set of possible PMI values that the device can select from when reporting PMI corresponds to a set of different precoder matrices. This set is referred to as the precoder codebook. The codebook is defined based on the number of available transmission ports, $N_T$ and the number of transmission layers $N_L$. There is at least one codebook for each valid combination of $N_T$ and $N_L$.

Reciprocity Assisted Transmission

Reciprocity-aided transmission (RAT) beamforming assumes that the downlink channel is reciprocal to the uplink channel, i.e., the downlink channel vector $H_i(t)$ can be estimated from the uplink reference symbols that are transmitted by the WD. Given the estimate $\hat{H}_i(t)$ of the downlink channel, the full rank beamforming matrix for the i-th WD can be selected based on the minimum mean square error criterion as:

$$W_i(t) = [w_{i,1}(t) \ldots w_{i,N_R}(t)] = \hat{H}_i^H(t)(\hat{H}_i(t)\hat{H}_i^H(t) + \Gamma I_{N_R})^{-1}$$

where $(\cdot)^H$ denotes the Hermitian transpose operator, F is a regularization factor, and $I_{N_R}$ is the $N_R \times N_R$ identity matrix.

There is no known RF EMF average power control algorithm that ensures that the controlled average power is below a power threshold 100% of the time. Such threshold is set per direction by consideration of RF EMF exposure regulations expressed in terms of an averaging time T.

There is no known average power control algorithm that performs such control per direction and that provides a 100% guarantee that RF EMF exposure limits are not exceeded. A consequence is that cell wide average power control is applied, a fact that requires more frequent limitations of the momentary power (i.e., the traffic). Consequently, the current cell wide solution may limit the momentary throughput in severe ways.

SUMMARY

Some embodiments advantageously provide a method and system for predictive sectorized average power control.

To be allowed to use an exclusion zone extension that is shorter than what is obtained using the maximum EIRP of the AAS equipped node, control functionality is provided that provides that the average power is below the set threshold 100% of the time. Such control functionality may ensure regulatory compliance for each direction of the antenna array of the AAS.

Some embodiments solve the above-described problems by providing a directional average power control algorithm that assures that the average power will not exceed an average power or average EIRP threshold, set to maintain a given exclusion zone size. Note that there is an average power threshold that is typically fixed and based at least in part on the selected exclusion zone size. An actuator may then be used to limit any momentary scheduled resources so that the average power does not exceed the threshold. The directional control algorithm disclosed herein employs multiple controllers; one for each spatial direction or sector. For each spatial controller, the momentary scheduled power, as estimated by the fraction of PRBs used at each time instant, is weighted by the beamforming gain in the spatial direction of the controller. The dynamic threshold of the scheduler is then obtained as the minimum threshold limitation of all the spatial controllers. The computed threshold is used to limit the number of PRBs available for scheduling. As a result, the RF exposure regulations are not violated in any spatial direction. Furthermore, since the WDs are generally located in different spatial directions, downlink transmissions to different WDs contribute to different spatial controllers resulting in significant momentary throughput gain over the current cell-wide solution. Some features of some embodiments include at least one of:

1. The algorithm guarantees time averaged power below the set threshold value, in each separate direction;
2. Significant improvement in downlink cell throughput over a cell-wide solution can be achieved; and/or
3. The algorithm can be easily implemented within the current architecture of the cell-wide average power control solution as it only requires instantiating multiple controllers, computing the beamforming gain, weighting the fraction of utilized PRBs by the beamforming gain, and computing the dynamic scheduler PRB threshold as the minimum of the thresholds of different spatial controllers.

According to one aspect, a method in a network node for controlling transmitted total power to maintain a time-average power below a threshold is provided. The method includes determining a beamforming gain for each of a plurality of spatial directions. The method also includes determining a total power at each of a plurality of times within a first window for each of the plurality of spatial directions, the total power being based at least in part on a weighted sum of products of a beamforming gain and a downlink power allocated to a wireless device in each of the plurality of spatial directions. The method further includes determining an average of the total power within the first window to produce an average power and computing a control signal based at least in part on the average power and a threshold. The method also includes controlling the transmitted total power according to the control signal by limiting a fraction of scheduled physical resource blocks, PRBs, to an upper limit.

According to this aspect, in some embodiments, controlling the transmitted power includes applying power scaling by the upper limit multiplied by an available transmission power. In some embodiments, the threshold is based at least in part on a relative equivalent isotropically radiated power, EIRP, limit. In some embodiments, the threshold is based at least in part on a maximum power divided by an equivalent isotropically radiated power, EIRP, of the network node. In some embodiments, the upper limit is a minimum limit of a plurality of limits, each limit of the plurality of limits specifying a limit on a fraction of scheduled PRBs for a corresponding spatial direction. In some embodiments, each limit of the plurality of limits is updated at least once for each of a plurality of control steps. In some embodiments, the beamforming gain is based at least in part on a normalized average beamforming gain over a plurality of subbands. In some embodiments, the beamforming gain for each subband is calculated by projecting a beamforming vector over a set of orthonormal basis vectors. In some embodiments, the beamforming gain is based at least in part on a number of multi-user multiple input multiple output, MU-MIMO, layers. In some embodiments, the total power at a time of the plurality of times is based at least in part on a ratio of a number of subbands used for downlink transmission to a particular wireless device to a total number of subbands used for downlink transmission to a plurality of wireless devices. In some embodiments, the average power is based at least in part on a recursively-computed backward accumulated power. In some embodiments, a predictive window encompasses a current time and a future time, T seconds after the current time, and wherein the average power includes a current power plus an average of predicted powers within the predictive window up to the future time.

According to another aspect, a network node configured to control transmitted power to meet a radio frequency, RF, threshold. The network node includes processing circuitry configured to: determine a beamforming gain for each of a plurality of spatial directions and determine a total power at each of a plurality of times within a first window for each of the plurality of spatial directions, the total power being based at least in part on a weighted sum of products of a beamforming gain and a downlink power allocated to a wireless device in each of the plurality of spatial directions. The processing circuitry is further configured to determine an average of the total power within the first window to produce an average power, compute a control signal based at least in part on the average power and a threshold, and control the transmitted total power according to the control signal by limiting a fraction of scheduled physical resource blocks, PRBs, to an upper limit.

According to this aspect, in some embodiments, controlling the transmitted power includes applying power scaling by the upper limit multiplied by an available transmission power. In some embodiments, the threshold is based at least in part on a relative equivalent isotropically radiated power, EIRP, limit. In some embodiments, the threshold is based at least in part on a maximum power divided by an equivalent isotropically radiated power, EIRP, of the network node. In some embodiments, the upper limit is a minimum limit of a plurality of limits, each limit of the plurality of limits specifying a limit on a fraction of scheduled PRBs for a corresponding spatial direction. In some embodiments, each limit of the plurality of limits is updated at least once for each of a plurality of control steps. In some embodiments, the beamforming gain is based at least in part on a normalized average beamforming gain over a plurality of subbands. In some embodiments, the beamforming gain for each subband is calculated by projecting a beamforming vector over a set of orthonormal basis vectors. In some embodiments, the beamforming gain is based at least in part on a number of multi-user multiple input multiple output, MU-MIMO, layers. In some embodiments, the total power at a time of the plurality of times is based at least in part on a ratio of a number of subbands used for downlink transmission to a particular wireless device to a total number of subbands used for downlink transmission to a plurality of wireless devices. In some embodiments, the average power is based at least in part on a recursively-computed backward accumulated power. In some embodiments, a predictive window encompasses a current time and a future time, T seconds after the current time, and wherein the average power includes a current power plus an average of predicted powers within the predictive window up to the future time.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
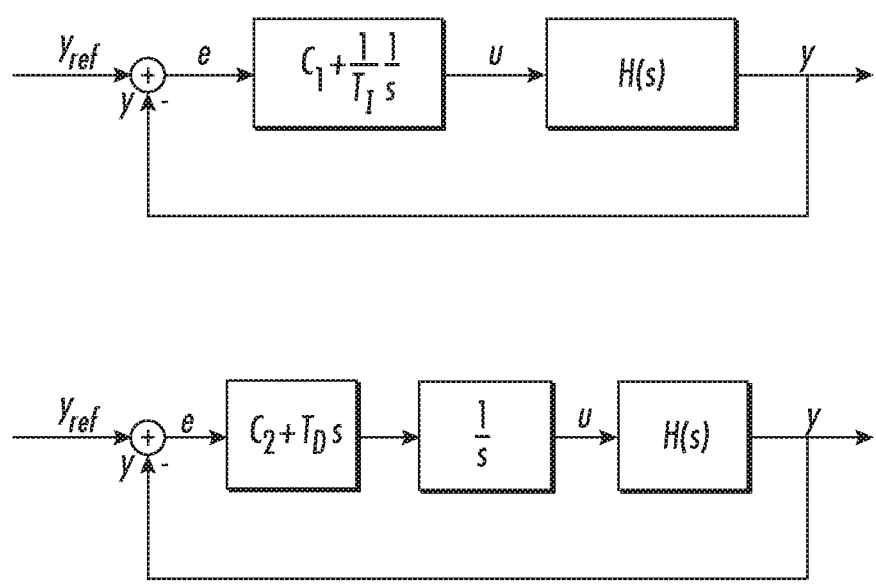
FIG. 1 illustrate two realization of PI control for average power control, the lower realization having a factored integrator.
Figure 2:
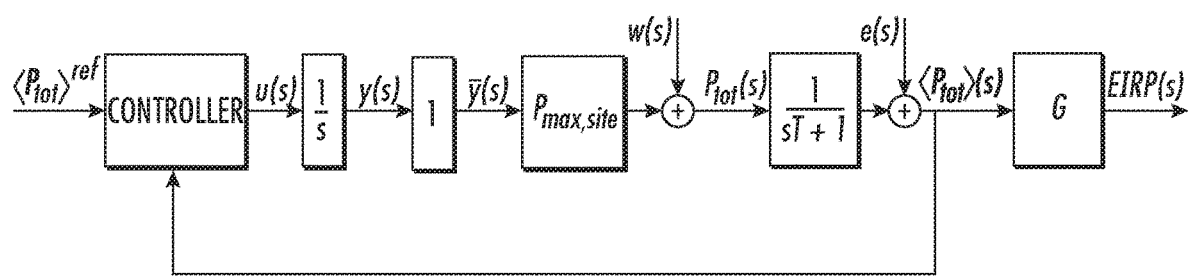
FIG. 2 is a block diagram of feedback control.

Before describing in detail exemplary embodiments, it is noted that the embodiments reside primarily in combinations of apparatus components and processing steps related to predictive sectorized average power control. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
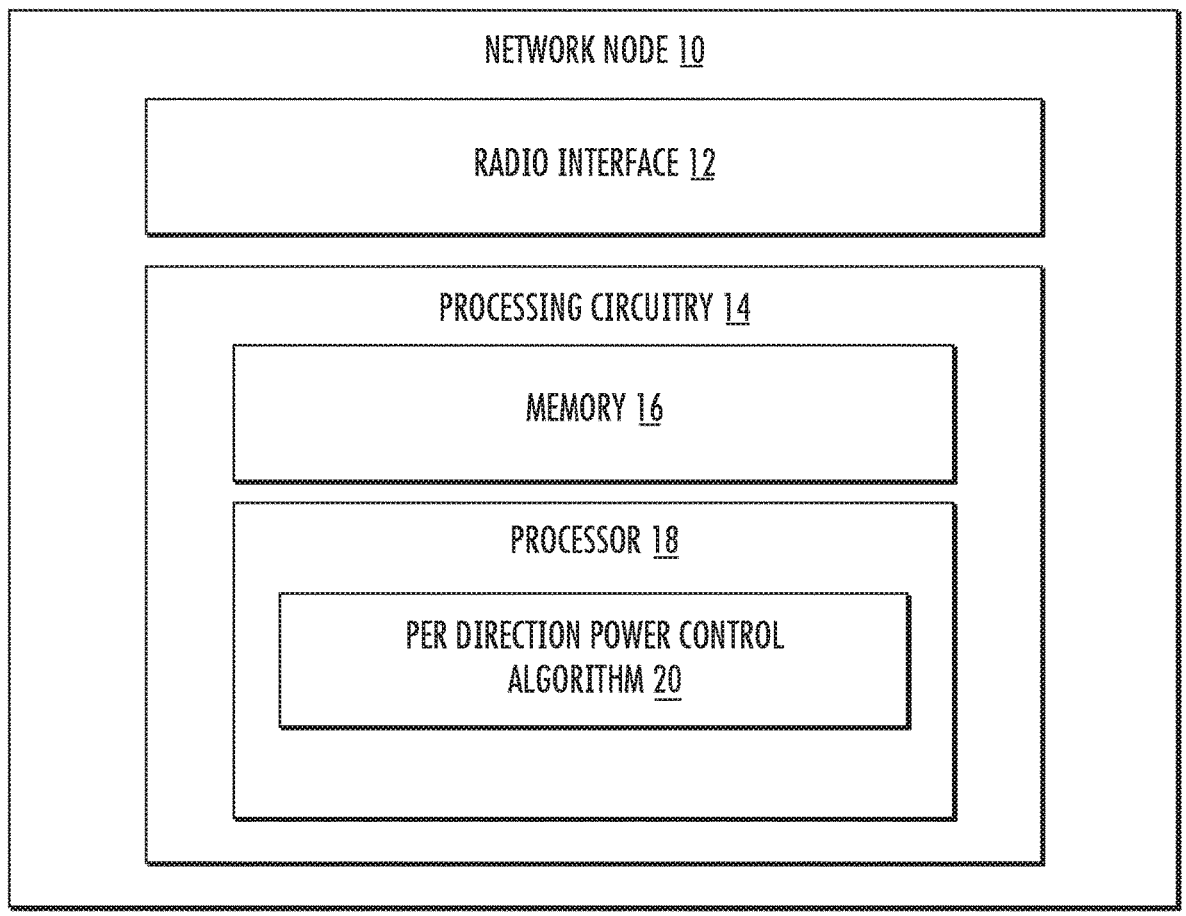
FIG. 3 is a block diagram of a network node according to principles disclosed herein.

Referring again to the drawing figures, there is shown in FIG. 3 a block diagram of an example network node 10. The network node 10 includes a radio interface 12 configured to wirelessly communicate with a wireless device (WD). The radio interface 12 includes an RF transceiver (which can be implemented as separate receiver(s) and transmitter(s)) and antenna(s). The network node 10 may also include one or more wired communication interfaces (not shown). The network node also includes processing circuitry 14 in communication with the radio interface 12 (and any wired interfaces). The processing circuitry 14 may include a memory 16 and processor 18. In particular, in addition to or instead of a processor, such as a central processing unit, and memory, the processing circuitry 14 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 18 may be configured to access (e.g., write to and/or read from) memory 16, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 14 may be configured to control any of the methods and/or processes described herein and/or to cause such methods, and/or processes to be performed. Processor 18 corresponds to one or more processors 18 for performing functions described herein.

The processing circuitry 14 implements a per-direction average power control algorithm 20 stored internally in, for example, memory 16, or stored in external memory (e.g., database, storage array, network storage device, etc.) accessible by the network node 10 via an external connection. The per-direction power control algorithm may be implemented as computer code executable by the processing circuitry 14. The per-direction average power control algorithm 20 is as described below.

Algorithm Description

Figure 4:
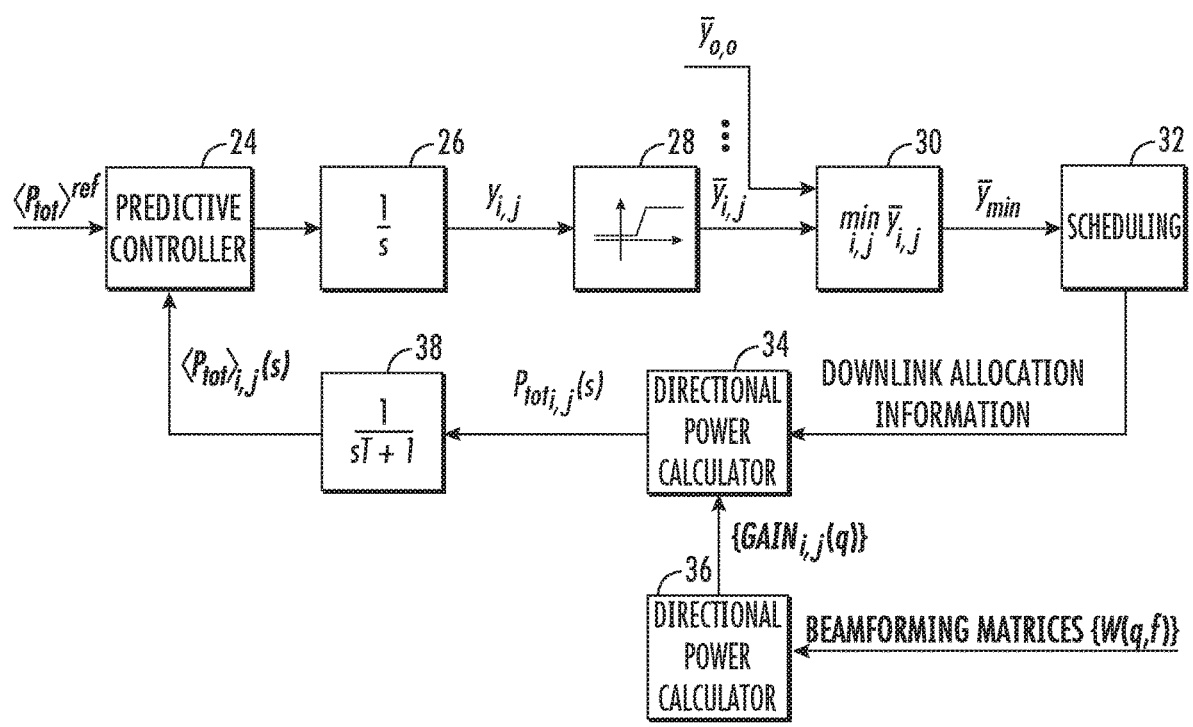
FIG. 4 is a block diagram of a per-direction electromagnetic field control algorithm according to the principles disclosed herein.

FIG. 4 shows a block diagram of an embodiment of a controller 22 for performing the per-direction average power control algorithm 20 (also referred to herein as the per direction average power control algorithm 20). In some embodiments, the controller 22 may be implemented via the processing circuitry 14. The EIRP may be used to denote the per-direction average power control algorithm 20 since the beam gain is mixed with the power in some embodiments. The embodiment of the controller 22 of FIG. 4 is a control loop that includes, in the forward path, a predictive controller 24, an integrator 26, a limiter 28, a threshold selector 30, and a scheduler 32. In the feedback path is a directional power calculator 34, which receives input from a beamforming gain calculator 36. The output of the directional power calculator 34 is averaged over time T in the averager 38. The output of the averager 38 is fed to the predictive controller 24.

Following standard procedures of automatic control, the poles of the closed loop system implemented via the controller 22 of FIG. 4 are given by the following second order equation:

$$s^2+(1/T+P_{max,site}CT_D)s+P_{max,site}C=0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2+(\alpha_1+\alpha_2)s+\alpha_1\alpha_2=0.$$

An identification of coefficients and a solution of the resulting system of equations reveal that the proportional gain and differentiation time can be selected as:

$$C = \frac{\alpha_1\alpha_2}{P_{max,site}}, \text{ and}$$

$$T_D = \frac{\alpha_1 + \alpha_2\frac{1}{T}}{\alpha_1\alpha_2}.$$

A reason for this choice is that a system with two negative real poles can be expected to be well damped, which is a result of a significant differentiation action. Since differentiation action is needed for fast back-off close to the determined threshold, the choice of C and $T_D$ may be the preferred design choice.

Some additional modification of the controller 22 may be made to adapt to the one-sided power back-off control problem formulation. This includes only allowing negative differentiation control and applying a hard safety limit in case the average power gets too close to the regulatory threshold. The asymmetric differentiation can be formulated as:

$$u(t)=CTe(t)+CTT_D \max(0,\dot{e}(t)).$$

To implement the feedback control mechanism, $\langle P_{tot}\rangle^{ref}$, $\langle P_{tot}\rangle(t)$ and $\langle P_{tot}'\rangle(t)$ may be used. Some embodiments provide means to obtain $\langle P_{tot}\rangle(t)$ and $\langle P_{tot}'\rangle(t)$ that solve the problems with known methods described above.

Discretization

The formulation above is in continuous time. However, the implementation is to be performed in discrete time. This means that all dynamic parts of the controller 22 and actuator are discretized. In some embodiments, the actuator is the combination of blocks 26-30 in FIG. 4. The averaging of the momentary power does not need to be discretized since this is done at the sampling rate, possibly by a recursive computation. The equations of the controller and actuator need to be discretized. This is done with a Euler approximation. However, other alternatives like the Tustin approximation could be used as well. The Euler approximation replaces the Laplace transform variable s, with the discrete time approximation of this derivative, i.e.:

$$s \to \frac{(q_{(T_S)})-1}{T_S}$$

Here $T_S$ denotes the sampling period, and $q_{(T_S)}^{-1}$ is the one step delay operator. This implicitly assumes regular sampling in time, with very little jitter. Sampling may not be event based. Therefore, a system clock is needed to drive the discrete time feedback control loop.

Starting with the actuator and using the fact that:

$$s\gamma(s)=u(s)$$

results in the discrete time equation:

$$\gamma(t+T_S)=\gamma(t)+T_Su(t).$$

When sampling in the PD controller 24, there is no effect on the proportional term. However, the error signal needs to be differentiated. Since the reference value is constant, it follows that the derivative of the average power should be sampled. Note that because of the differentiation, filtering of this derivative may also be needed, according to the equation:

$$y(s) = \frac{\alpha}{s+\alpha} s(\langle P_{tot}\rangle^{ref} - \langle P_{tot}\rangle(s)) = -\frac{\alpha s}{s+\alpha}\langle P_{tot}\rangle(s)$$

where the filter bandwidth may be selected as $\alpha=0.05$ rad/s. Here the derivative is denoted by y(s). Following the same procedure as for the actuator results in the discrete time equation:

$$y(t)=y(t-T_S)-\alpha T_S y(t-T_S)-\alpha(\langle P_{tot}\rangle(t)-\langle P_{tot}\rangle(t-T_S)).$$

The discrete time control signal therefore becomes:

$$u(t)=CT(\langle P_{tot}\rangle(t)^{ref}\langle P_{tot}\rangle(t)-T_D \max(y(t),0.0)).$$

The per-direction average power control algorithm 20 employs multiple spatial controllers 22 where each controller 22 is associated with a prespecified spatial direction ($\theta_i$, $\phi_j$), where $\phi_j$ denotes a given azimuth angle, and $\theta_i$ denotes an elevation angle. Each spatial controller 22 utilizes the beamforming gain calculation block 36 that computes the beamforming gain due to using a given beamforming vector in the spatial controller direction. After each downlink scheduling instant, in case a complete control step consisting of a multitude of scheduling time steps, has passed, the downlink allocation and relevant link adaptation information are used to update the state of the spatial controllers 22. The downlink allocation information includes the number of resource elements allocated to different downlink channels, e.g., the physical downlink shared channel (PDSCH) and the physical downlink control channel (PDCCH) in 4G/5G systems. The downlink allocation information may also include the number of resource elements used to transmit the reference signals. The link adaptation information includes the number of layers used for each WD, the beamforming vectors used to transmit different physical channels, and the power share of each layer. After updating the state of each feedback controller, at each control step, the dynamic scheduler threshold is computed at Block 28 as the minimum of the thresholds of all the spatial controllers. i.e.:

$$\bar{\gamma}_{min} = \min_{i,j} \bar{\gamma}_{i,j}$$

The computed dynamic threshold is then used to limit the number of PRBs available for scheduling by blocking a (1–$\bar{\gamma}_{min}$) fraction of the available PRBs or applying power scaling by using a $\bar{\gamma}_{min}$ fraction of the available transmission power. Note that 24, 26, 28, 30 and 38 are updated with the control step sampling rate, while 32, 34 and 36 are updated with a rate corresponding to or close to the scheduling rate. A typical control step update sampling period may be 600 ms and a typical scheduling rate may be of the order of 1 ms.

Beamforming Gain Calculation

As illustrated in FIG. 4, each spatial controller 22 is associated with a beamforming calculator 36. A function of the beamforming gain calculator 36 is to return a scalar, $\text{Gain}_{i,j}(q)$, representing the average (over the allocated subbands) fraction of power radiated in the spatial direction ($\theta_i$, $\phi_j$) for the downlink allocation of user q.

Consider a dual-polarized two-dimensional $M_V \times M_H \times 2$ array configuration where $M_V$ is the number of rows and $M_H$ is the number of columns of the array. Let W(q,f) denote $M \times N_L$ precoding matrix used for transmission to user q on subband f, where $M=2M_H M_V$ is the number of antenna elements and $N_L$ (q) is the number of layers allocated to user q. Then:

$$W(q,f) = \begin{bmatrix} W^{(0)}(q,f) \\ W^{(1)}(q,f) \end{bmatrix}$$

where the $$\frac{M}{2} X N_L(q)$$

matrix $W^{(p)}$ (q,f) is the precoding matrix for antenna elements with polarization p. Two methods for calculating the beamforming gain are presented. The first method corresponds to the actual radiated gain in a physical spatial direction corresponding to the azimuth-elevation angles ($\theta_i$, $\phi_j$). The second method utilizes a DFT-based two-dimensional spatial basis that enables computing the beamforming gain of different beamformers with reduced computational complexity independent of the array geometry.

Spatial Beamforming Gain Calculation

The array steering vector is defined as the set of phase delays a plane wave experiences, evaluated at a set of array elements (antennas). The phases are specified with respect to an arbitrary origin. For example, consider a two-dimensional polarized array where $M_V$ and $M_H$ denote the number of rows and columns of the 2-dimensional antenna array, respectively, i.e., the total number of antenna elements is given by $2M_V M_H$. For simplicity. assume that the antenna elements are equally spaced where $d_V$ and $d_H$ denote the inter-element spacing in the vertical and horizontal directions, respectively. Assume that the array elements are placed in the X-Z plane. Let a($\theta_i$, $\phi_j$) denote the $M_V M_H \times 1$ per-polarization array steering vector corresponding to the azimuth-elevation angles ($\theta_i$, $\phi_j$). The entry of the steering vector corresponding to the antenna element in row m and column n is given by:

$$a(\theta_i, \phi_j)_{m,n} = \frac{1}{\sqrt{M_H M_N}} e^{j\frac{2\pi}{\lambda}(d_H(m-1)\sin(\theta_i)\cos(\phi_j)+d_V(n-1)\cos(\theta_i))}$$

where m=0, . . . , $M_H$–1 and n=0, 1, . . . , $M_V$–1.

The beamforming gain, $\text{Gain}_{i,j}(q)$, for user q allocation utilizing the precoding matrices $\{W(q,f)\}_f$ is calculated as follows:

For each allocated subband f, Compute the total beamforming gain of the precoder for subband f as:

$$G_{i,j}(q,f) = \sum_{k=1}^{N_L(q)} \sum_{p=0}^{1} |w_k^{(p)}(q,f)^T a(\theta_i, \phi_j)|^2$$

where $w_k^{(p)}$(q,f) is the kth column of $W^{(p)}$(q,f).

Compute the average beamforming gain over all subbands:

$$G_{i,j}(q) = \frac{1}{N_f(q)} \Sigma_f G_{i,j}(q,f)$$

where $N_f(q)$ is the total number of subbands allocated to user q; and

Compute the normalized average beamforming gain $$\text{Gain}_{i,j}(q) = \frac{P(q)}{\alpha(q)} G_{i,j}(q) \text{ where } \alpha(q) = \max_{i,j} G_{i,j}(q) \text{ and } P(q) = \frac{N_L(q)}{L}$$

and L is the total number of MU-MIMO layers.

DFT-Based Beamforming Gain Calculation

In order to reduce the computational complexity of calculating the beamforming gain, the per-polarization oversampled 2-dimensional DFT-based beams are defined as:

$$B = D_H \otimes D_V$$

where $\otimes$ denotes the Kronecker product operator, $D_H$ and $D_V$ are $M_H \times M_H O_H$ and $M_V \times M_V O_V$ oversampled discrete Fourier transform (DFT) matrices, $O_H$ and $O_V$ is the oversampling factor in the horizontal and vertical directions, respectively. The (m,k)th element of the matrix $D_x$ is given by:

$$D_X(m, k) = \frac{1}{\sqrt{M_X}} e^{j\frac{2\pi mk}{M_X O_X}} \text{ where } m =$$

$$0, \ldots, M_X - 1, k = 0, \ldots, M_X O_X - 1.$$

The beamforming gain, $\text{Gain}_{i,j}(q)$, for user q allocation utilizing the precoding matrices $\{W(q,f)\}_f$ is calculated following the same steps as those described above. In particular:

For each allocated subband f, Compute the total beamforming gain of the precoder for subband f as:

$$G_{i,j}(q, f) = \sum_{k=1}^{N_L(q)} \sum_{p=0}^{1} |w_k^{(p)}(q, f)^T b(i, j)|^2$$

where b(i,j) is the column vector of the matrix B that corresponds to the direction of the (i,j)-th spatial controller;

Compute the average beamforming gain over all subbands:

$$G_{i,j}(q) = \frac{1}{N_f(q)} \Sigma_f G_{i,j}(q, f)$$

Compute the normalized average beamforming gain $$\text{Gain}_{i,j}(q) = \frac{P(q)}{\alpha(q)} G_{i,j}(q).$$

An advantage of using the DFT-based beamforming gain calculation method is that the beamforming gain is readily available in most cases independently of the array geometry. For example, for codebook-based precoding schemes, the precoding matrices are known a priori and belong to a finite codebook. Furthermore, wideband precoding is usually used, i.e., the same beamforming vector may be applied to all allocated subbands. Hence, for a given choice of the spatial controller directions, a look-up table can be constructed that maps each precoder to the corresponding average beamforming gain $G_{i,j}$. On the other hand, for reciprocity-based precoding schemes, the beamforming weight computations are typically performed in the beam space domain in order to allow for beam reduction. Hence, the product $w_k^{(p)}(q,f)^T b(i,j)$ are readily available when beamforming weights are computed. Therefore, for reciprocity-based schemes, only a small number of computations (magnitude computation, averaging over frequency) is required to compute the beamforming gain.

Directional Power Calculator

The total momentary transmitted power at time t in the spatial direction $(\theta_i, \phi_j)$ can be estimated by the directional power calculator 34 by collecting the allocated downlink power for each WD and weighting this power by the average beamforming gain for this WD in the direction $(\theta_i, \phi_j)$, i.e.:

$$P_{tot_{i,j}}(t) = \sum_q \frac{N_f(t, q)}{N_{subbands}(t)} G_{i,j}(t, q) P_{tot}(t)$$

where $P_{tot}(t)$ is the total momentary power utilized at time t, $G_{i,j}(t,q)$ is the average beamforming gain for user WD q at transmission time t, $N_f(t,q)$ is the number of subbands utilized for downlink transmission to user q at time t, and $N_{subbands}(t)$ is the total number of subbands used for downlink transmission a time t.

In addition to the power contributions from the downlink transmissions for different WDs, the power of other channels, e.g., control channels, may also be accounted for while calculating the total power. Similar to WD-specific transmissions, the directional power of the control channels is computed by weighting the momentary control channel power by the average beamforming gain of the common control beam weights in the direction $(\theta_i, \phi_j)$.

Model Predictive Controller (MPC)

Overview

The predictive time-averaged per-direction average power control algorithm 20 disclosed herein is established such that the regulated time-averaged power is guaranteed to stay below a power threshold at all times. The power threshold is computed based on the designed RF EMF compliance boundary (exclusion zone) of the site. The average power controller described in the Background section above does not have this property. This is because linear control, like known PD, is not designed to provide such guarantees.

One reason for this effect is that when the averaging window is first filled with very low momentary powers, followed by very high power for say 1.5 minutes, the average power reaches a level close to the limit. During the remaining averaging time up to T, there is nonzero minimum power entering the window due, for example, to PDCCH power. This leads to an increased average power, since the values close to zero in the window initially are shifted out. Hence, an overshoot cannot be prevented. This is admittedly a rare situation. However, since it can occur in the field it is a non-negotiable requirement to implement algorithms that prevents this behavior with 100% guarantee. As used herein, the predictive window refers to the remaining time left within the averaging window.

Main Idea and Controller Signal Selection

To better understand the solution, a few observations are useful:

The momentary powers in the sliding window "now", affect the average power T minutes (such as 6 minutes) ahead in time;

Any action taken to avoid overshoot "now", may be evaluated for the coming 6 minutes, for example, to guarantee that there cannot be an overshoot due to the power contents in the window "now".

The following question is relevant to whether a limit violation may occur.

Question: Given a current time $t_0$, a power profile $P_{tot}(t)$, $t=t_0, \ldots, t_0-(N-1)T_S$ in the sliding window, and a minimum controlled momentary power of a $P_{max,site}$, where $a \in [0,1]$, then what is the maximum possible average power during the coming T seconds (N samples). In other words, for $t=t_0+T_S, \ldots, t_0+NT_S$, provided that regulation at future times is done to limit the power to be less than or equal to a $P_{max,site}$?

Provided that a solution to the question can be easily computed, a guarantee can then be obtained provided that the following control strategy is applied:

If any $\langle P_{tot}\rangle(t_0+iT_S) > \varepsilon P_{max,site}-e$, $i=1, \ldots, N$ then $\gamma(t)=\gamma_{hardlimit}$ where $\varepsilon$ is the relative EIRP limit, determined from the selected exclusion zone, $\gamma_{hardlimit} \in [0,1]$ is the hard limit fraction of PRBs that can be scheduled, and e is a pre-configured margin.

Evaluation of Future Average Powers and Computation of New

MPCtrigger

Figure 5:
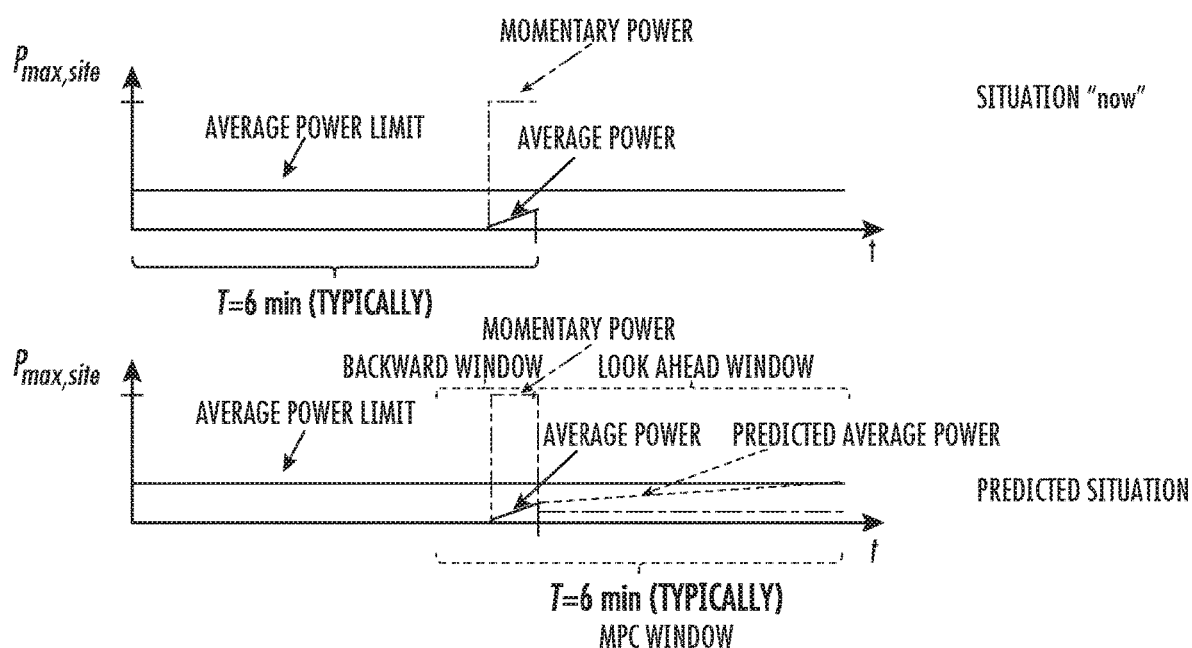
FIG. 5 is a timing diagram showing windows involved in the model predictive coder trigger computation according to principles disclosed herein.

The next step is to answer the question, in terms of a computationally efficient per-direction average power control algorithm 20. Referring to FIG. 5, it turns out that one efficient way to compute the average power for future times is to start by locating the look ahead window to predict a maximum of T ahead in time. In such a situation, there is no contribution from the backward window. Then the windows are moved one sample towards the left, leading to a recursive computation of the average power $\langle P_{tot}\rangle(t_0+iT_S)$, $i=1, \ldots, N$.

To outline the details, it follows first that:

$$\langle P_{tot}(t_0+NT_S)\rangle = \frac{NaP_{max,site}}{N} = aP_{max,site}.$$

Then for the window positions indexed by $N>i\geq 0$, it follows that:

$$\langle P_{tot}\rangle(t_0+iT_S) = \frac{iaP_{max,site}+P_{tot}(t_0)+\ldots+P_{tot}(t_0+(i-(N-1))T_S)}{N}$$

The computational complexity can be reduced. Noting that the contribution from the backward window contain the N−i last momentary power samples, for $N>i\geq 0$. This means that the sum of power contributions from the backward window can be recursively computed, by introduction of the backward accumulated power:

$P_{backward,i} =$
$P_{backward}(t_0+(i-(N-1))T_S) = P_{tot}(t_0)+\ldots+P_{tot}(t_0+(i-(N-1))T_S))$ This quantity can be recursively computed as follows:

- Initialize $P_{backward,N} = 0$, $i = N$
- While $i > 2$
  - $i = i - 1$
  - $P_{backward,i} = P_{backward,i+1} + P_{tot}(t_0 + (i - (N-1))T_S))$
- End The complete recursive per-direction average power control algorithm 20 for evaluation of future average power, together with the computation of the Boolean used to trigger predictive back-off using hard limitation, for all times up to T ahead in time therefore becomes:

- Initialize $P_{backward,N} = 0$, $\langle P_{tot}\rangle(t_0 + NT_S) = \frac{NaP_{max,site}}{N} = aP_{max,site}$, MPCtrigger = false, i =
- While i > 2 & MPCtrigger = false
- i = i − 1
- $P_{backward,i} = P_{backward,i+1} + P_{tot}(t_0 + (i - (N-1))T_S))$

- $\langle P_{tot}\rangle(t_0 + iT_S) = \frac{iaP_{max,site} + \langle P_{backward,i}\rangle}{N}$

- If $\langle P_{tot}\rangle(t_0 + iT_S) > \varepsilon P_{max,site} - e$
  MPCtrigger = true
- End
- End Power Back Off Triggering In known solutions, logic for triggering a hard back-off is based on average power levels. Typically, such a condition to enter and leave such a hard limitation may be implemented by the following logic:

- If$\langle P_{tot}\rangle$ (t) > $\varepsilon P_{max,site}$ margin
  - hardlimit = true
- End
- If$\langle P_{tot}\rangle$ (t) < $\delta_1 \varepsilon P_{max,site}$
  - hardlimit= false
- End where margin is slightly lower than 1, say typically 0.96, and $\delta_1$ significantly lower than 1, say 0.7.

When using the disclosed predictive guaranteeing trigger, one preferred way of integration into the above logic is the conservative approach given by:

- If$\langle P_{tot}\rangle$ (t) > $\varepsilon P_{max,site}$margin or MPCtrigger = true
  - hardlimit = true
- end
- If$\langle P_{tot}\rangle$ (t) < $\delta_1 \varepsilon P_{max,site}$ and MPCtrigger = false
  - hardlimit = false
- end This way the hardlimit will be triggered more often than when only level-based triggering is used. Another way to implement triggering is to discard the level-based triggering altogether:

- If MPCtrigger = true
  - hardlimit = true
- end
- If MPCtrigger = false
  - hardlimit = false
- end As is obvious to anyone skilled in the art, still further variants exist.

Flow Chart

Figure 6:
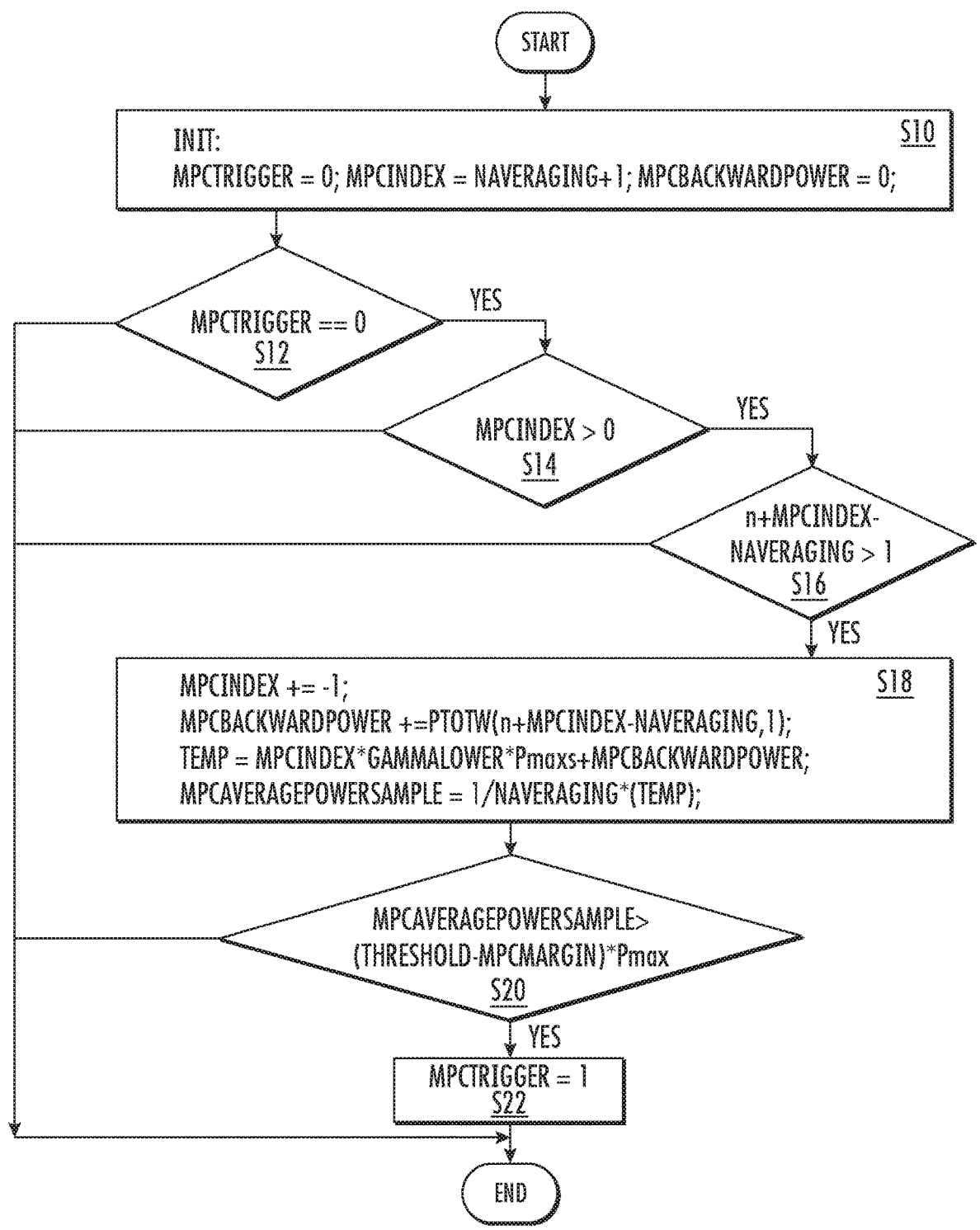
FIG. 6 is a flowchart of a predictive coder trigger algorithm according to principles disclosed herein.

A flowchart of an example predictive coder (MPC) based hard limit trigger is described with reference to FIG. 6. The process includes initialization (Block S10), testing an MPC trigger (Block S12), testing an MPC index (Block S14), and testing a counter related to averaging (Block S16). In Block S18, the process includes computing MPC backward power and MPC average power. The process also includes testing the computed MPC average power (Block S20) and setting the MPC trigger to 1. The functions of each block of FIG. 6 are performed according to the Model Predictive Coder per-direction average power control algorithm 20 described above.

Simulation Results

Performance Gain Due to Directional EMF Control

The performance of the proposed per-direction average power control algorithm 20 is illustrated using system-level simulations. A 5G cellular system with bandwidth of 36 MHz and a carrier frequency of 3.5 GHz is simulated. The system operates in time division duplex mode where the downlink/uplink timeslot pattern is 3/1. A single cell scenario with a cell radius of 166 meters is considered, where WDs are initialized with random locations. The 5G Spatial Channel Model (SCM) for Urban Macro channels with non-line of sight (NLOS) communication is used. The antenna configuration at the network node 10 is the 4×8×2 configuration (cross polarized antenna elements of 4 rows and 8 columns). The traffic model for the downlink is selected as full buffer.

Sounding reference symbol (SRS)-based channel acquisition is considered, where the uplink channel estimates are obtained using periodically transmitted full-bandwidth SRS from the WD every 10 msec. Adaptive multi-user multiple input multiple output (MU-MIMO) reciprocity-based precoding is utilized in downlink transmission where a variable number of WDs can be paired together and each WD can be assigned a maximum of 2 Layers. The averaging window length of the per-direction average power control algorithm 20 is selected as 6 seconds and the simulation duration is 36 seconds. Simulation results are averaged over 50 Monte Carlo runs where the WDs are randomly dropped in each simulation.

The performance of the proposed directional average EIRP control algorithm 20 was then investigated for two variants. The first variant has 7 horizontal beams and 3 vertical beams (H7V3) resulting in 21 spatial directions for average EIRP control. The second variant has a denser spatial grid of 105 spatial directions; 15 horizontal beams and 7 vertical beams (H15V7). As a benchmark, the legacy cell-wide average per-direction average power control algorithm 20 and the case with no average power control are considered.

Figure 7:
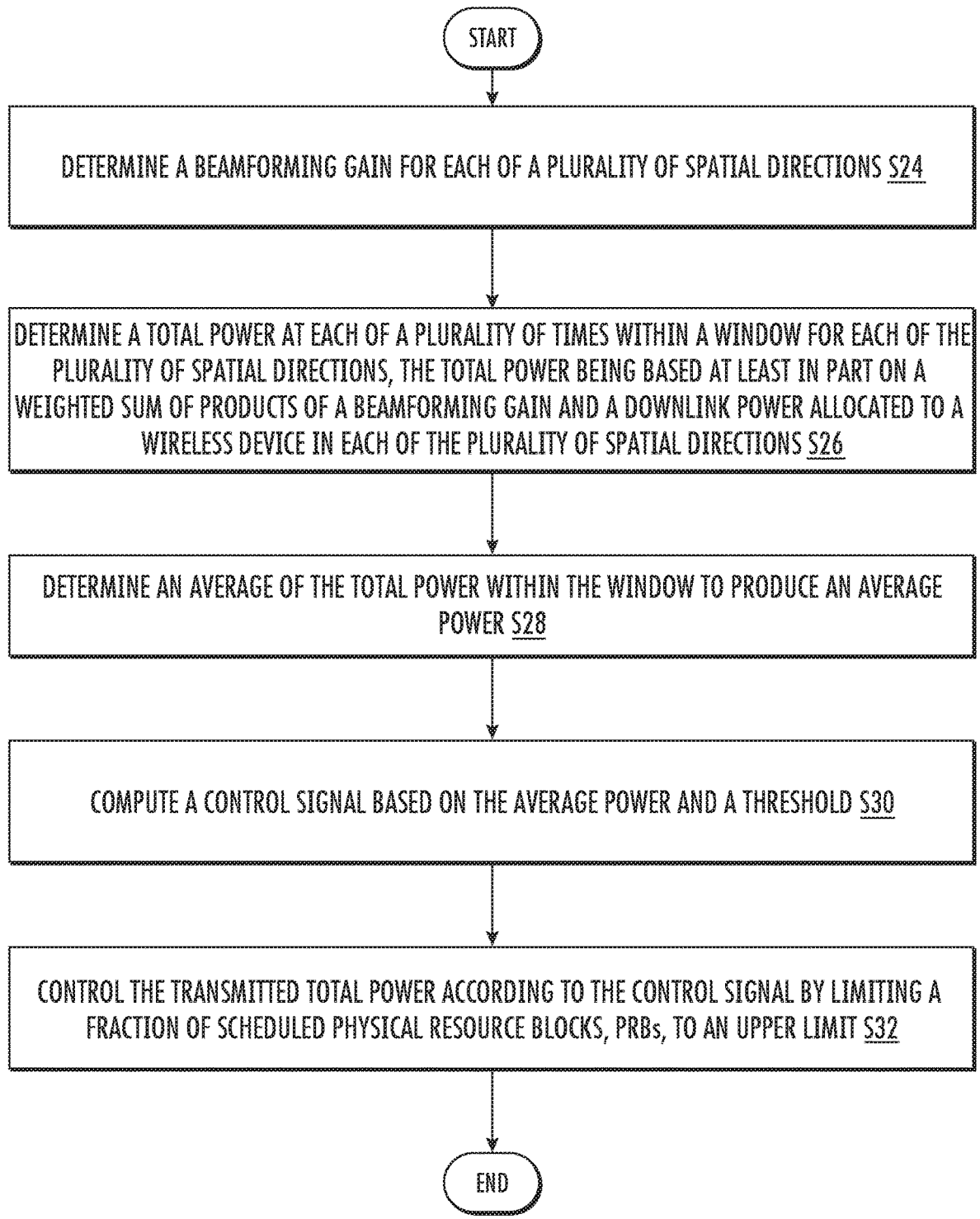
FIG. 7 is a flowchart of an exemplary process in a network node for transmit power control according to principles set forth herein.

FIG. 7 is a flowchart of an example process for per-direction average according to principles disclosed herein. The process may be performed by the processing circuitry 14, radio interface 12, and/or processor 18 (including the per-direction average power control algorithm 20). The process includes determining a beamforming gain for each of a plurality of spatial directions (Block S24). The process also includes determining a total power at each of a plurality of times within a window for each of the plurality of spatial directions, the total power being based at least in part on a weighted sum of products of a beamforming gain and a downlink power allocated to a wireless device in each of the plurality of spatial directions (Block S26). The process also includes determining an average of the total power within the window to produce an average power (Block S28). The process further includes computing a control signal based on the average power and a threshold (Block S30). The process further includes controlling the transmitted total power according to the control signal by limiting a fraction of scheduled physical resource blocks, PRBs, to an upper limit (Block S32).

Figure 8:
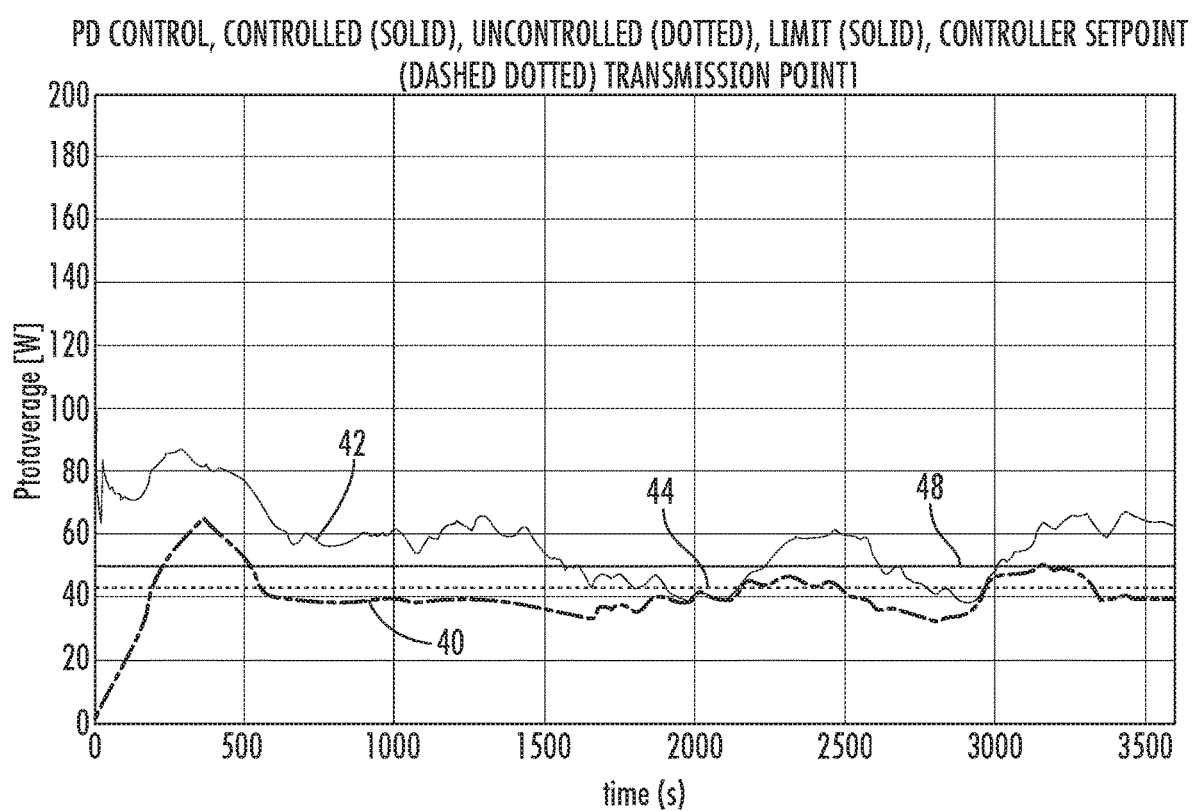
FIG. 8 is a graph of total average power versus a number of users.
Figure 9:
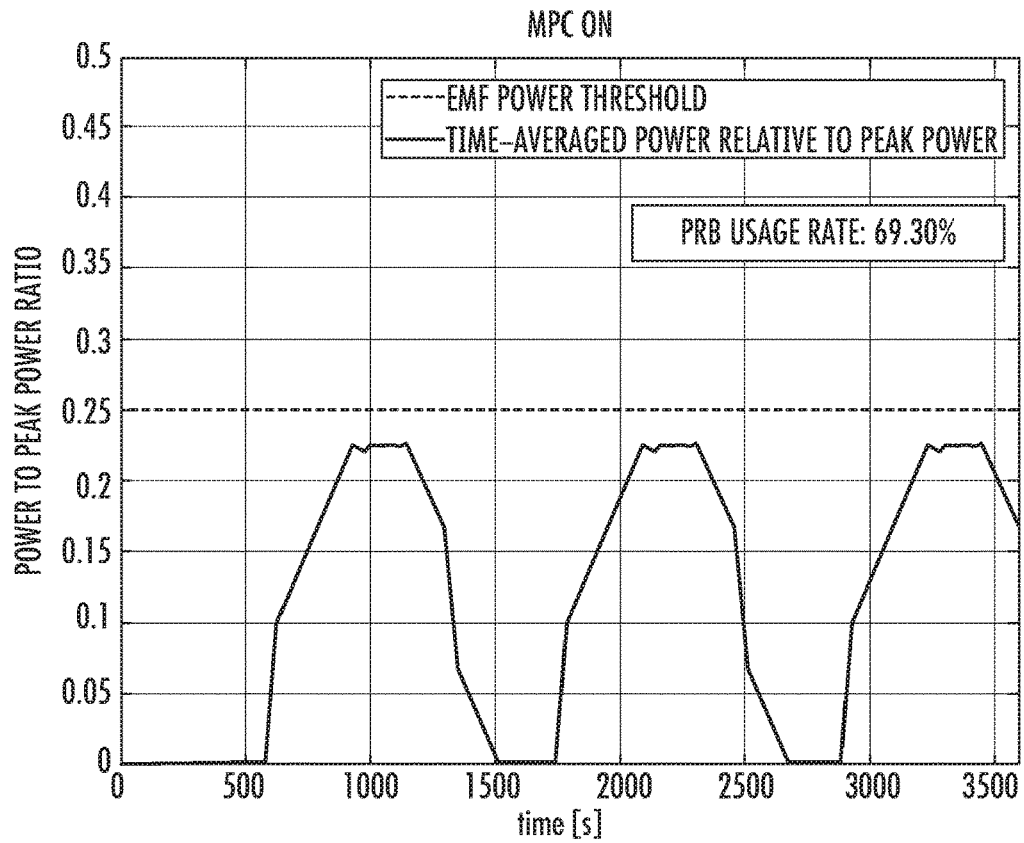
FIG. 9 is a graph of the ratio of power to peak power versus time.

FIG. 8 is a graph of average total power versus time. As shown by FIG. 8, there may still be overshoots in the average power. In FIG. 8, the non-linear trace 40 is the average total power with PD control, the non-linear trace 42 is the average power with no PD control, the straight line 44 is the controller setpoint, and the straight line 48 is a power threshold based on regulatory limits. FIG. 9 is a graph showing the ratio of power to peak power versus time. The graph of FIG. 9 illustrates a behavior when the methods described herein are employed. Significantly, the ratio never exceeds a specified EMF power threshold.

Figure 10:
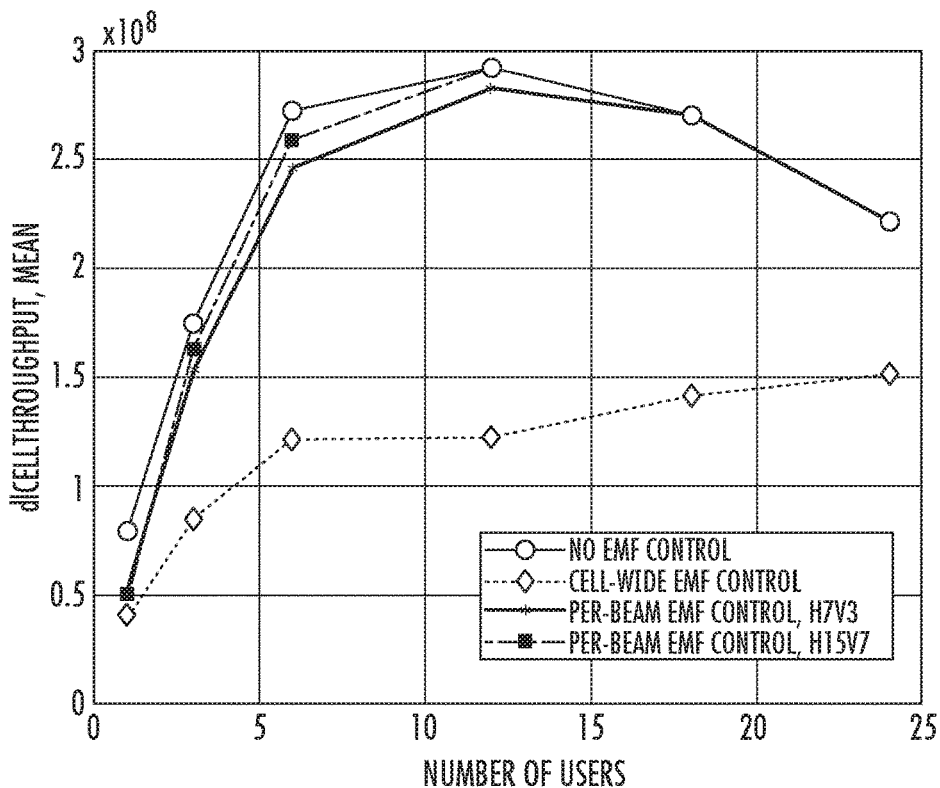
FIG. 10 is a graph of cell throughput versus a number of users in the cell.
Figure 11:
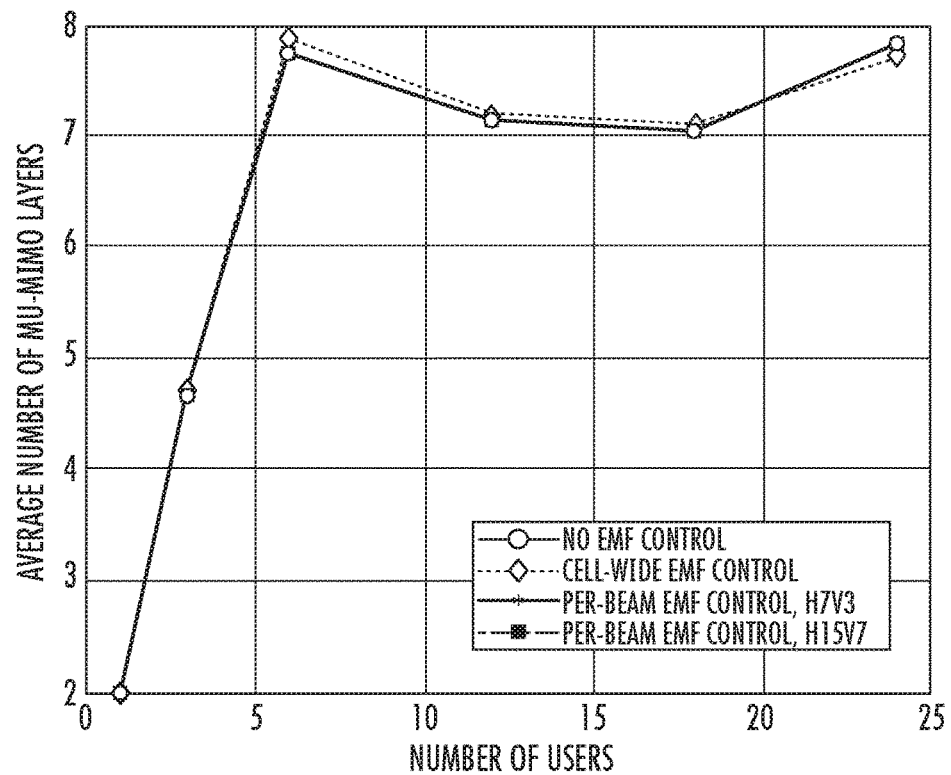
FIG. 11 is a graph of average number of MU-MIMO layers versus a number of users in a cell.
Figure 12:
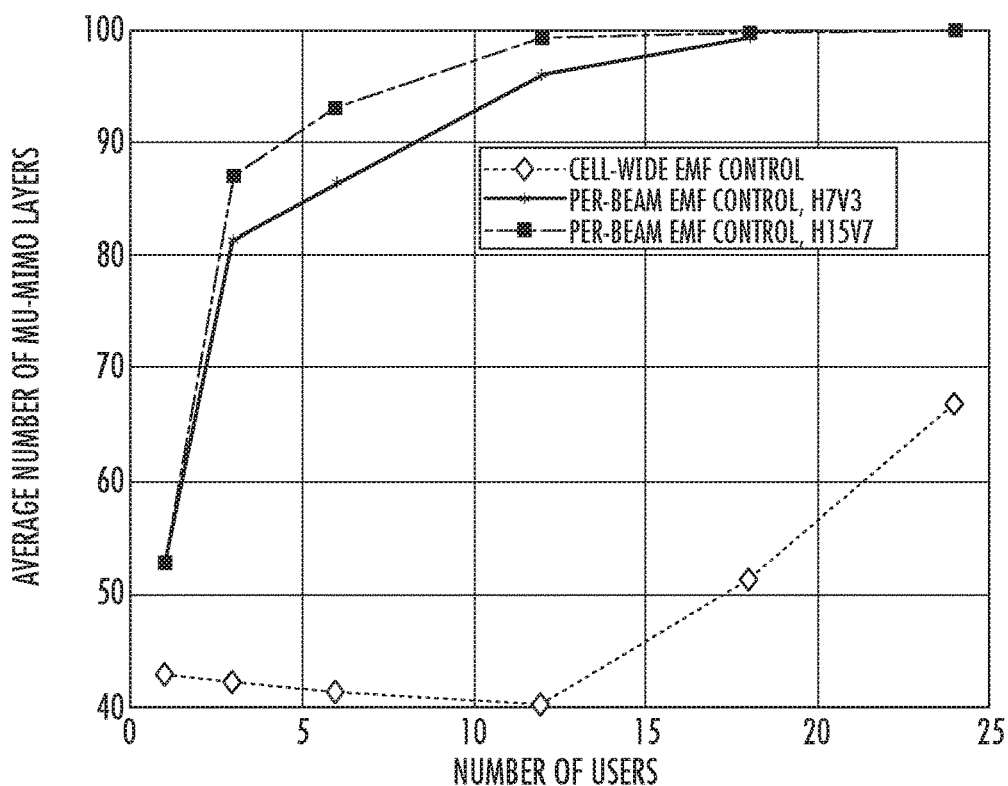
FIG. 12 is a graph of average number of allocated PRBs versus a number of users in a cell.

FIG. 10 is a graph showing the average downlink cell throughput versus the number of active users in the cell. From this figure it is clear that that the directional average EIRP per-direction average power control algorithm 20 shows significant improvement in performance over cell-wide average power control. The performance improvement increases as the number of available WDs for MU-MIMO pairing increases, i.e., as the number of MU-MIMO layers increases, as shown in FIG. 11. This can be attributed to the fact that when the number of MU-MIMO paired WDs increases, the likelihood of the contributing to different spatial beams increases, leading to larger performance improvement over cell-wide average power control. The throughput improvement is due to the larger number of allocated PRBs with per-beam average EIRP control than with cell wide average power control as shown in FIG. 12. As the number of spatial control directions is increased from 21 to 105, the performance of the per-direction average power control algorithm 20 improves and approaches the solution where no average power control is applied.

Thus, some embodiments employ multiple average EIRP controllers; one for each spatial direction. For each spatial average EIRP controller, the momentary scheduled power, as estimated by the fraction of PRBs used at each time instant, is weighted by the beamforming gain in the spatial direction of the controller. The dynamic threshold of the scheduler is then obtained as the minimum threshold limitation of all the spatial average EIRP controllers. The computed threshold is used to limit the number of available PRBs for scheduling or to scale down the downlink transmission power. Some embodiments exhibit significant performance improvement over legacy cell-wide average power control solutions as such embodiments exploit the variations in the beam directions used for transmission to different WDs. Furthermore, some embodiments guarantee that the average power (or EIRP) is kept below the set reference value, in each separate direction.

According to one aspect, a method in a network node 10 for controlling transmitted total power to maintain a time-average power below a threshold is provided. The method includes determining a beamforming gain for each of a plurality of spatial directions. The method also includes determining a total power at each of a plurality of times within a first window for each of the plurality of spatial directions, the total power being based at least in part on a weighted sum of products of a beamforming gain and a downlink power allocated to a wireless device in each of the plurality of spatial directions. The method further includes determining an average of the total power within the first window to produce an average power and computing a control signal based at least in part on the average power and a threshold. The method also includes controlling the transmitted total power according to the control signal by limiting a fraction of scheduled physical resource blocks, PRBs, to an upper limit.

According to this aspect, in some embodiments, controlling the transmitted power includes applying power scaling by the upper limit multiplied by an available transmission power. In some embodiments, the threshold is based at least in part on a relative equivalent isotropically radiated power, EIRP, limit. In some embodiments, the threshold is based at least in part on a maximum power divided by an equivalent isotropically radiated power, EIRP, of the network node 10. In some embodiments, the upper limit is a minimum limit of a plurality of limits, each limit of the plurality of limits specifying a limit on a fraction of scheduled PRBs for a corresponding spatial direction. In some embodiments, each limit of the plurality of limits is updated at least once for each of a plurality of control steps. In some embodiments, the beamforming gain is based at least in part on a normalized average beamforming gain over a plurality of subbands. In some embodiments, the beamforming gain for each subband is calculated by projecting a beamforming vector over a set of orthonormal basis vectors. In some embodiments, the beamforming gain is based at least in part on a number of multi-user multiple input multiple output, MU-MIMO, layers. In some embodiments, the total power at a time of the plurality of times is based at least in part on a ratio of a number of subbands used for downlink transmission to a particular wireless device to a total number of subbands used for downlink transmission to a plurality of wireless devices. In some embodiments, the average power is based at least in part on a recursively-computed backward accumulated power. In some embodiments, a predictive window encompasses a current time and a future time, T seconds after the current time, and wherein the average power includes a current power plus an average of predicted powers within the predictive window up to the future time.

According to another aspect, a network node 10 configured to control transmitted power to meet a radio frequency, RF, threshold. The network node 10 includes processing circuitry 14 configured to: determine a beamforming gain for each of a plurality of spatial directions and determine a total power at each of a plurality of times within a first window for each of the plurality of spatial directions, the total power being based at least in part on a weighted sum of products of a beamforming gain and a downlink power allocated to a wireless device in each of the plurality of spatial directions. The processing circuitry 14 is further configured to determine an average of the total power within the first window to produce an average power, compute a control signal based at least in part on the average power and a threshold, and control the transmitted total power according to the control signal by limiting a fraction of scheduled physical resource blocks, PRBs, to an upper limit.

According to this aspect, in some embodiments, controlling the transmitted power includes applying power scaling by the upper limit multiplied by an available transmission power. In some embodiments, the threshold is based at least in part on a relative equivalent isotropically radiated power, EIRP, limit. In some embodiments, the threshold is based at least in part on a maximum power divided by an equivalent isotropically radiated power, EIRP, of the network node 10. In some embodiments, the upper limit is a minimum limit of a plurality of limits, each limit of the plurality of limits specifying a limit on a fraction of scheduled PRBs for a corresponding spatial direction. In some embodiments, each limit of the plurality of limits is updated at least once for each of a plurality of control steps. In some embodiments, the beamforming gain is based at least in part on a normalized average beamforming gain over a plurality of subbands. In some embodiments, the beamforming gain for each subband is calculated by projecting a beamforming vector over a set of orthonormal basis vectors. In some embodiments, the beamforming gain is based at least in part on a number of multi-user multiple input multiple output, MU-MIMO, layers. In some embodiments, the total power at a time of the plurality of times is based at least in part on a ratio of a number of subbands used for downlink transmission to a particular wireless device to a total number of subbands used for downlink transmission to a plurality of wireless devices. In some embodiments, the average power is based at least in part on a recursively-computed backward accumulated power. In some embodiments, a predictive window encompasses a current time and a future time, T seconds after the current time, and wherein the average power includes a current power plus an average of predicted powers within the predictive window up to the future time.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviations used herein are as follows:
Advanced Antenna Systems (AAS)
Channel Quality Indicator (CQI)
Equivalent Isotropically Radiated Power (EIRP)
Electromagnetic Field (EMF)
International Commission on Non-Ionizing Radiation Protection (ICNIRP)
Model Predictive Controller (MPC)
New Radio (NR)
Proportional-Derivative (PD)
Physical Downlink Control Channel (PDCCH)
Physical Downlink Shared Channel (PDSCH)
Proportional-Integral (PI)
Precoder matrix indicator (PMI)
Physical Resource Blocks, (PRBs)
Reciprocity-aided transmission (RAT)
Rank Indicator (RI)
Radio Frequency (RF)
Sounding Reference Symbol (SRS)

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for controlling transmitted total power to maintain a time-average power below a threshold, the method comprising:
    determining a beamforming gain for each of a plurality of spatial directions;
    determining a total power at each of a plurality of times within a first window for each of the plurality of spatial directions, the total power being based at least in part on a weighted sum of products of a beamforming gain and a downlink power allocated to a wireless device in each of the plurality of spatial directions;
    determining an average of the total power within the first window to produce an average power;
    computing a control signal based at least in part on the average power and a threshold; and
    controlling the transmitted total power according to the control signal by limiting a fraction of scheduled physical resource blocks, PRBs, to an upper limit, controlling the transmitted total power comprising applying power scaling by the upper limit multiplied by an available transmission power.

2. The method of claim 1, wherein the threshold is based at least in part on a relative equivalent isotropically radiated power, EIRP, limit.

3. The method of claim 1, wherein the threshold is based at least in part on a maximum power divided by an equivalent isotropically radiated power, EIRP, of the network node.

4. The method of claim 1, wherein the upper limit is a minimum limit of a plurality of limits, each limit of the plurality of limits specifying a limit on a fraction of scheduled PRBs for a corresponding spatial direction.

5. The method of claim 4, wherein each limit of the plurality of limits is updated at least once for each of a plurality of control steps.

6. The method of claim 1, wherein the beamforming gain is based at least in part on a normalized average beamforming gain over a plurality of subbands.

7. The method of claim 6, wherein the beamforming gain is based at least in part on a number of multi-user multiple input multiple output, MU-MIMO, layers.

8. The method of claim 1 wherein the beamforming gain for each subband is calculated by projecting a beamforming vector over a set of orthonormal basis vectors.

9. The method of claim 1, wherein the total power at a time of the plurality of times is based at least in part on a ratio of a number of subbands used for downlink transmission to a particular wireless device to a total number of subbands used for downlink transmission to a plurality of wireless devices.

10. The method of claim 1, wherein the average power is based at least in part on a recursively-computed backward accumulated power.

11. The method of claim 1, wherein a predictive window encompasses a current time and a future time, T seconds after the current time, and wherein the average power includes a current power plus an average of predicted powers within the predictive window up to the future time.

12. A network node configured to control transmitted total power to meet a radio frequency, RF, threshold, the network node comprising processing circuitry configured to:
   determine a beamforming gain for each of a plurality of spatial directions;
   determine a total power at each of a plurality of times within a first window for each of the plurality of spatial directions, the total power being based at least in part on a weighted sum of products of a beamforming gain and a downlink power allocated to a wireless device in each of the plurality of spatial directions;
   determine an average of the total power within the first window to produce an average power;
   compute a control signal based at least in part on the average power and a threshold; and
   control the transmitted total power according to the control signal by limiting a fraction of scheduled physical resource blocks, PRBs, to an upper limit, controlling the transmitted total power comprising applying power scaling by the upper limit multiplied by an available transmission power.

13. The network node of claim 12, wherein the threshold is based at least in part on a relative equivalent isotropic radiated power, EIRP, limit.

14. The network node of claim 12, wherein the threshold is based at least in part on a maximum power divided by an equivalent isotropically radiated power, EIRP, of the network node.

15. The network node of claim 12, wherein the upper limit is a minimum limit of a plurality of limits, each limit of the plurality of limits specifying a limit on a fraction of scheduled PRBs for a corresponding spatial direction.

16. The network node of claim 15, wherein each limit of the plurality of limits is updated at least once for each of a plurality of control steps.

17. The network node of claim 12, wherein the beamforming gain is based at least in part on a normalized average beamforming gain over a plurality of subbands.

18. The network node of claim 12, wherein the beamforming gain for each subband is calculated by projecting a beamforming vector over a set of orthonormal basis vectors.

19. The network node of claim 18, wherein the beamforming gain is based at least in part on a number of multi-user multiple input multiple output, MU-MIMO, layers.

20. The network node of claim 12, wherein the total power at a time of the plurality of times is based at least in part on a ratio of a number of subbands used for downlink transmission to a particular wireless device to a total number of subbands used for downlink transmission to a plurality of wireless devices.

21. The network node of claim 12, wherein the average power is based at least in part on a recursively-computed backward accumulated power.

22. The network node of claim 12, wherein a predictive window encompasses a current time and a future time, T seconds after the current time, and wherein the average power includes a current power plus an average of predicted powers within the predictive window up to the future time.

* * * * *